June 1, 1971 — M. L. HAIR ET AL — 3,582,474
METHOD AND APPARATUS FOR MEASURING POTASSIUM ION ACTIVITY
Filed Sept. 18, 1968
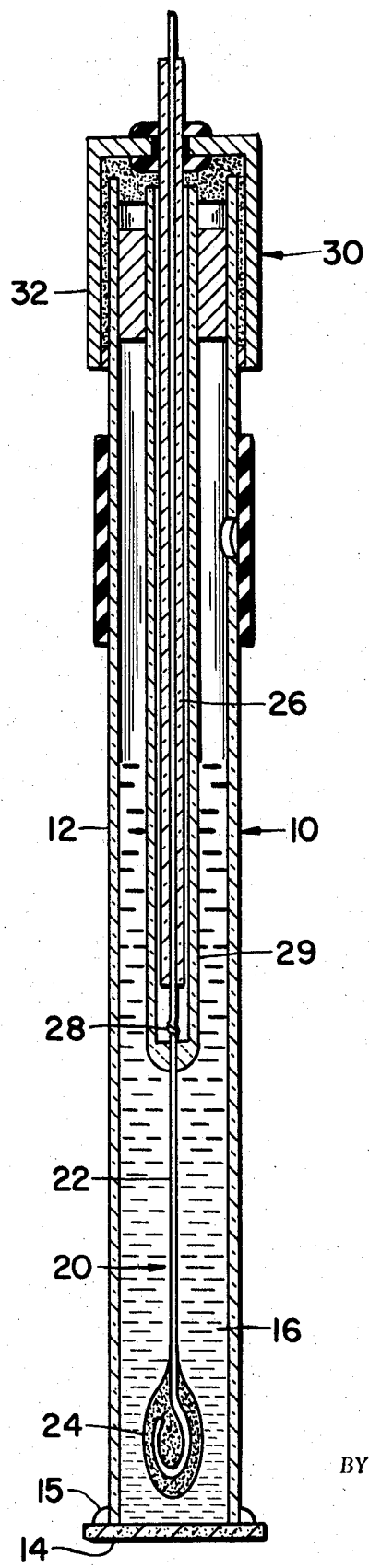
INVENTORS.
Michael L. Hair
Inci Altug
BY
*Gerhard K. Adam*
ATTORNEY

United States Patent Office

3,582,474
Patented June 1, 1971

3,582,474
METHOD AND APPARATUS FOR MEASURING POTASSIUM ION ACTIVITY
Michael L. Hair, Corning, N.Y., and Inci Altug, Bloomington, Ind., assignors to Corning Glass Works, Corning, N.Y.
Filed Sept. 18, 1968, Ser. No. 760,608
Int. Cl. G01n 27/46
U.S. Cl. 204—1
3 Claims

ABSTRACT OF THE DISCLOSURE

An electrochemical apparatus for selectively determining the activity of potassium ions in an aqueous solution.

---

Electrochemical instruments are well known in analytical chemistry for furnishing rapid and accurate determinations of chemical constituents in solution. A commonly used laboratory instruments of this type is the pH meter which essentially is made up of a sensing electrode, a reference electrode, and a potentiometer. The two electrodes are simultaneously immersed into a test solution such that an electrochemical cell develops, the potential generated by the electrodes being approximately proportional to the logarithm of the reciprocal of the hydrogen ion concentration.

The most convenient and versatile of the hydrogen sensing electrodes is the "glass electrode," so-called because it has a glass membrane at which the significant electropotential arises. Structurally, the glass electrode includes the elements of a glass tube or body, an internal reference electrode, a sensing membrane, and a liquid electrolyte contact between the membrane and the internal reference electrode. As a further development, it was found that glass electrodes sensitive to cations other than hydrogen, such as sodium and potassium, could be made in which the sensing portion is formed from special nonporous glass compositions. Significant work in this field was done by G. Eisenman et al. and described in U.S. Pats. No. 2,829,090 and No. 3,041,252.

In accordance with the present invention, we have discovered an electrode for measuring the activity of potassium ions in an aqueous solution wherein the sensing portion of the electrode is comprised of a sintered porous glass membrane having a pore size 2.7–10 A. These electrodes are selective to potassium ions in the presence of sodium and hydrogen ions.

The invention is more clearly understood from the following description taken in conjunction with the accompanying drawing which is a cross-sectional view of a representative electrode formed according to the principles of the present invention.

Referring now to the drawing, the electrode 10 of the present invention is comprised of an outer glass body 12 having an opening at one end. At the other end of the glass body 12, a sintered porous glass membrane 14 is attached by a suitable means such as by a silicone rubber adhesive 15. The interior of the glass body 12 is occupied by an electrolyte, such as a saturated aqueous solution of potassium chloride, which makes electrical contact between the sintered porous glass membrane 14 and a conventional internal reference electrode 20. Typically, the internal reference electrode 20 is a platinum wire 22 having at its lower portion a silver/silver chloride coating 24. The platinum wire 22 is then attached to a shielded cable 26 by means of solder joint 28. There is an inner glass tube 29 which encapsulates the shielded cable 26. At the opening of the glass body, designated as the upper end 30 of the electrode, there is placed a cap 32 which serves as a seal.

The improvement in the glass electrode to which the present invention is directed concerns the structure and nature of the membrane separating the internal reference solution from the aqueous test solution. As shown in the drawing, and the accompanying description, the sensing portion is a sintered porous glass membrane.

The porous glass membrane is characterized by a multiplicity of intercommunicating, submicroscopic pores throughout its mass. These pores are typically in the range of 2.7–10 A. in diameter. An inherent property, related directly to the method of forming the membrane, is that the composition thereof contains greater than 90% by weight silica. Glasses of this type have been consolidated into high silica glasses, also conventionally known as 96% silica glasses.

The initial procedure for making the porous glass membrane and a particularly suitable family of borosilicate glasses are described in U.S. Pat. No. 2,221,709 issued to Hood et al. Briefly, the method includes forming an article of the desired shape from a parent borosilicate glass; thermally treating the glass article at a sufficient temperature e.g. 500°–600° C. for a period of time to separate the glass into a silica-rich phase and a silica-poor phase; dissolving or leaching the silica-poor phase, usually with acid, to produce a porous structure composed of the silica-rich phase; and washing to remove the leaching residue. After being dried, the porous glass typically has a pore size of 25–100 A. The glass is now subjected to a sintering procedure by heating at a temperature of about 750°–1050° C. for a period of about 0.5–21 hours. The sintered porous glass has a pore size of 2.7–10 A. in diameter, as measured in the dry state.

Our invention is further illustrated by the following examples:

EXAMPLE I

Electrodes were prepared as shown in the drawing. The sintered porous glass membranes were made from the following glass composition:

| Ingredient: | Weight percent |
|---|---|
| $B_2O_3$ | 14.77 |
| $As_2O_3$ | 0.68 |
| PbO | 5.78 |
| $Al_2O_3$ | 1.31 |
| $SiO_2$ | 73.15 |
| $Na_2O$ | 3.57 |
| $Li_2O$ | 0.03 |
| $K_2O$ | 0.37 |
| Total | 99.66 |

The glass was formed into disks which were leached in 1.0 N $HNO_3$ acid for three hours. They were 0.5 mm. thick and subjected to a heat treatment of 580° C. for three hours. The leached glass disks were sintered at temperatures varying from 750°–820° C. in air. The furnace was heated at a rate of 200° C./hour up to the sintering temperature. The sintering times were from 30–80 minutes. The sintered porous glass membranes were sealed to the glass body of an electrode as shown in the drawing using Silastic RTV 732 which is a room-temperature-vulcanizing silicone rubber, especial designed for use as an adhesive.

The total membrane potential was measured by means of the following cell:

| Ag—AgCl | Reference Solution | Membrane | Test Solution | KCl Saturated | $Hg_2Cl_2$ | Hg |

Throughout the experiments, a 0.1 N KCl solution was used. The electrodes were connected to a Corning Model 12 pH meter, which was used as a potentiometer. Readings were made at room temperature.

The selectivity constant $K_{NaK}$ was determined by comparing the ion activities required to produce the same electrochemical effects. The membrane potential was recorded as a function of K+ or Na+ ion activity in KCl or NaCl test solutions and the membrane potential E(mV) was plotted against the negative logarithm of K+ or Na+ ion activity in the solution.

Because of the ion selectivity of the membrane, different amounts of K+ and Na+ ions are required to produce the same EMF. The ratio of the K+ and Na+ activities at a given EMF value expresses the $K_{NaK}$ constant, as defined by the equation:

$$K_{NaK}^{pot} = \frac{a_{K^+}}{a_{Na^+}}$$

It was determined that the selectivity constant $K_{NaK}=8$ for an electrode having a sintered porous membrane (2.8 A. diameter pore size) which had been sintered at 800° C. for 80 minutes.

EXAMPLE II

Using the procedure of Example I, electrodes were prepared having sintered porous glass membranes made from the following glass composition:

| Ingredient: | Weight percent |
| --- | --- |
| $SiO_2$ | 50.5 |
| $Al_2O_3$ | 1.97 |
| $B_2O_3$ | 41.3 |
| $Na_2O$ | 6.1 |
| $As_2O_3$ | 0.8 |

Glass disks were formed and leach as described in Example I. They were then sintered at temperatures of about 1000° C. for 3–21 hours. It was found that the selectivity constant $K_{NaK}=10$ for an electrode having a sintered porous glass membrane (2.7 A. diameter pore size) which had been sintered at 1006° C. for 21 hours.

Obviously, many modifications and variations of the invention as hereinabove set forth may be made without departing from the spirit or the scope thereof, and only such limitations should be applied as indicated in the claims.

We claim:
1. A method of measuring the activity of potassium ions in an aqueous solution comprising providing an electrode having a sensing portion comprised of a sintered porous glass membrane having a pore diameter of 2.7–10 A., in the dry state, subjecting the aqueous solution to said electrode and to a standard reference electrode, and operatively connecting the electrodes to a potentiometer.

2. The method of claim 1 wherein the measurement of potassium ion is selective in an aqueous solution including sodium and hydrogen ions.

3. A glass electrode for measuring the activity of potassium ions in an aqueous solution comprising:
   (a) a hollow tube having an opening at one end;
   (b) a semipermeable porous glass membrane disposed in covering relationship across said opening;
   (c) an internal reference electrode; and
   (d) an electrolyte solution for making electrical contact between said membrane and said internal reference electrode, said membrane being characterized by a multiplicity of intercommunicating submicroscopic pores having a pore diameter in the dry state in the range from about 2.7–10 A. and a glass composition containing greater than 90% by weight silica.

References Cited

UNITED STATES PATENTS

| 2,221,709 | 11/1940 | Hood et al. | 106—54 |
| 2,829,090 | 4/1958 | Eisenman et al. | 204—195.1 |
| 3,041,252 | 6/1962 | Eisenman et al. | 204—195.1 |
| 3,305,468 | 2/1967 | Liesch | 204—195 |
| 3,338,812 | 8/1967 | Dworak et al. | 204—195 |
| 3,448,032 | 6/1969 | Settzo et al. | 204—195 |

TA-HSUNG TUNG, Primary Examiner

U.S. Cl. X.R.

204—195